US008631466B2

(12) United States Patent
Cha et al.

(10) Patent No.: US 8,631,466 B2
(45) Date of Patent: Jan. 14, 2014

(54) MACHINE TO-MACHINE (M2M) CALL FLOW SECURITY

(75) Inventors: Inhyok Cha, Yardley, PA (US); Michael Meyerstein, Ipswich (GB); Lawrence Case, Austin, TX (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 80 days.

(21) Appl. No.: 13/197,007

(22) Filed: Aug. 3, 2011

(65) Prior Publication Data

US 2012/0198520 A1   Aug. 2, 2012

Related U.S. Application Data

(60) Provisional application No. 61/370,279, filed on Aug. 3, 2010.

(51) Int. Cl.
  *G06F 7/04* (2006.01)
(52) U.S. Cl.
  USPC ........ 726/3; 726/1; 726/2; 713/165; 713/167; 713/168; 713/171; 713/180; 713/181; 713/193
(58) Field of Classification Search
  USPC .......... 726/1–3; 713/165–168, 171, 180–181, 713/193
  See application file for complete search history.

(56) References Cited

U.S. PATENT DOCUMENTS

| | | | |
|---|---|---|---|
| 6,915,437 B2 * | 7/2005 | Swander et al. .................. 726/1 |
| 7,444,509 B2 * | 10/2008 | Nadalin et al. ................ 713/156 |
| 7,647,627 B2 * | 1/2010 | Maida-Smith et al. ......... 726/12 |
| 7,779,449 B2 * | 8/2010 | Pham ................................ 726/1 |
| 7,856,655 B2 * | 12/2010 | Swander et al. .................. 726/2 |
| 8,160,495 B2 * | 4/2012 | Khedouri et al. ............. 455/41.2 |
| 8,306,546 B2 * | 11/2012 | Ryu et al. ....................... 455/450 |
| 8,400,935 B2 * | 3/2013 | Pelletier et al. ............... 370/252 |

FOREIGN PATENT DOCUMENTS

WO   WO 2010/027765 A2   3/2010

OTHER PUBLICATIONS

3rd Generation Partnership Project (3GPP), TR 33.812 V9.2.0, "3rd Generation Partnership Project; Technical Specification Group Services and System Aspects; Feasibility study on the security aspects of remote provisioning and change of subscription for Machine to Machine (M2M) equipment (Release 9)", Jun. 2010, 87 pages.
European Telecommunications Standards Institute (ETSI), TS 102 690 V0.5.1, "Machine-to-Machine communications (M2M); Functional architecture", Feb. 2010, 100 pages.

* cited by examiner

*Primary Examiner* — Kambiz Zand
*Assistant Examiner* — Tongoc Tran
(74) *Attorney, Agent, or Firm* — Condo Roccia LLP

(57) ABSTRACT

Systems, methods, and instrumentalities are disclosed to provide secure operations in an M2M device. An M2M device may receive an indication that an operation to be performed is security sensitive. The M2M device may determine that the operation is to be performed in a secure environment on the M2M device. The secure environment may be a logically distinct portion of the M2M device. The determination may be made in in accordance with a policy. For example, the M2M device may determine that the operation meets a requirement specified in the policy indicating that the operation is to be performed in the secure environment. The M2M device may perform the operation in the secure environment on the M2M device. The M2M device may store a result relating to the operation in the secure environment.

16 Claims, 15 Drawing Sheets

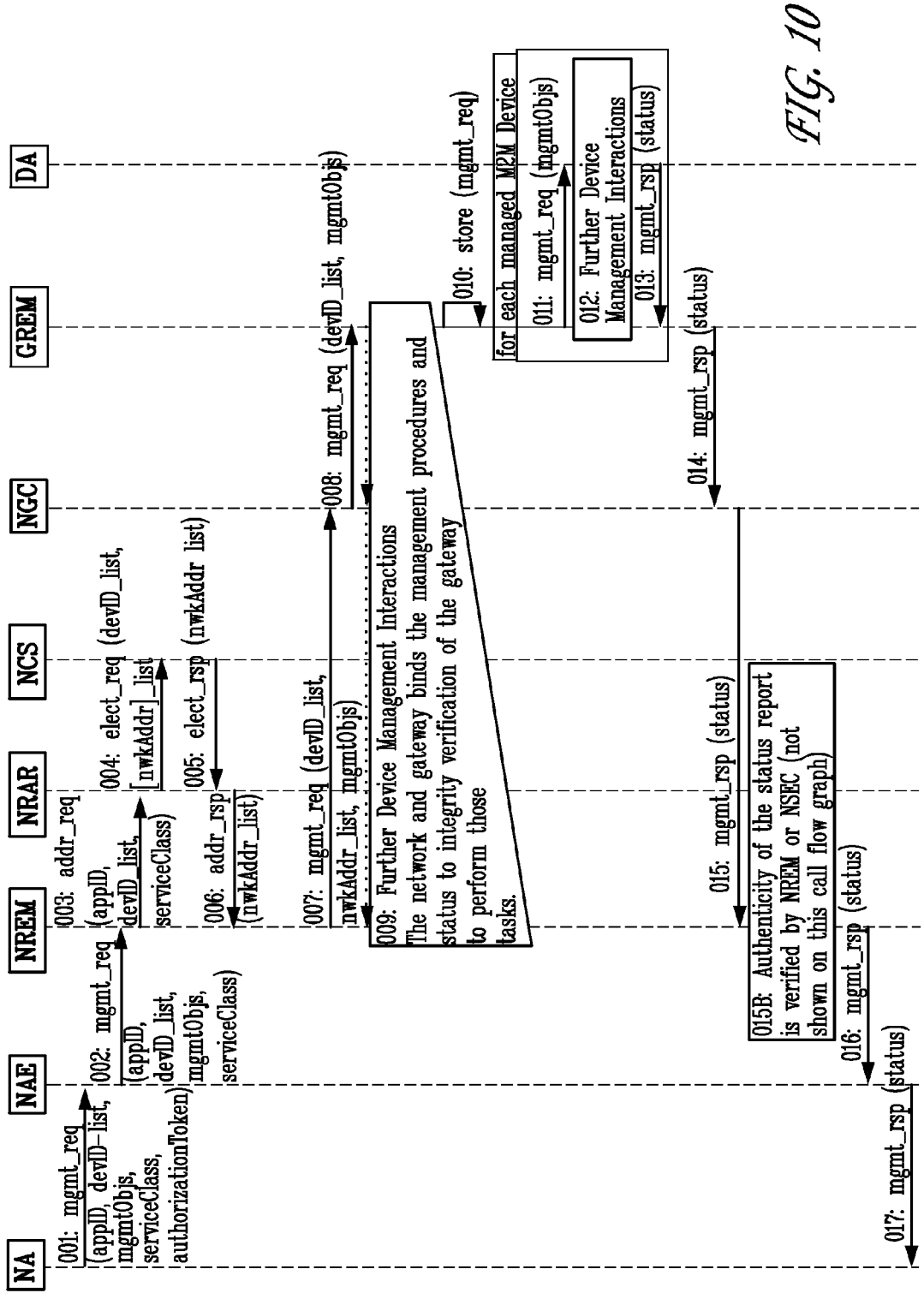

MACHINE TO-MACHINE (M2M) CALL FLOW SECURITY

CROSS-REFERENCE TO RELATED APPLICATIONS

This application claims the benefit of U.S. Provisional Patent Application No. 61/370,279, filed on Aug. 3, 2010, the contents of which are hereby incorporated by reference herein.

BACKGROUND

Machine to Machine (M2M) communication (also referred to as "machine-type communications" or "MTC") may be seen as a form of data communication between entities that do not necessarily need human interaction.

M2M communication may be used in a variety of areas. In the area of security, M2M communication may be used in surveillance systems, in backup of telephone landlines, in the control of physical accesses (e.g. to buildings), and in car/driver security. In the area of tracking and tracing, M2M communication may be used for fleet management, order management, Pay As You Drive (PAYD) applications, asset tracking, navigation, traffic information applications, road tolling, traffic optimization, and steering. In the area of payment systems, M2M communication may be used in point of sales, vending machines, customer loyalty applications, and gaming machines. In healthcare, M2M communication may be used for remotely monitoring vital signs, supporting the elderly or handicapped, in web access telemedicine points, and in remote diagnostics. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), and/or other technologies such as those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of MTC devices. Additionally, further enhancements to these technologies may provide additional opportunities for the deployment of M2M-based solutions.

Current M2M-based functionality may not adequately address security in M2M networks, including M2M devices.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Systems, methods, and instrumentalities are disclosed to provide secure operations in an M2M device. An M2M device may receive an indication that an operation to be performed is security sensitive. As an example, the operation may comprise generating a key for use in a communication session or for storage of information on the M2M device. The M2M device may determine that the operation is to be performed in a secure environment on the M2M device. The secure environment may be a secure execution environment, which may be a logically distinct portion of the M2M device. The determination may be made in in accordance with a policy. For example, the M2M device may determine that the operation meets a requirement specified in the policy indicating that the operation is to be performed in the secure environment. The M2M device may perform the operation in the secure environment on the M2M device. The secure environment may be provided in a removable module (e.g., a module attached or connected to the M2M device). The M2M device may store a result relating to the operation in the secure environment.

The M2M device may send a security profile of the M2M device to a core network. For example, the M2M device may send the security profile to a service capability associated with the core network. The security profile may indicate to the core network the type and extent of security capability the M2M device supports. The M2M device may receive a response from the core network relating to the security profile. The response may include a security requirement for the M2M device to satisfy relating to a communication session or operation of the M2M device. The security requirement may include a security profile setting for one or more of the following: secure storage, secure execution, or integrity validation. A security profile setting may be specified for each of the applications, operations, or services to be performed on the M2M device, or, for one or more specific applications, operations, or services to be performed on the M2M device. The M2M device may adjust an indicated setting of the security profile to reflect the received value(s) of the specified security profile setting. The M2M device may produce a final security profile. The M2M device may send a final security profile to the core network to be used by the M2M device in the communication session or operation of the M2M device.

The M2M device may receive, from the core network, a security requirement for the M2M device to satisfy relating to a communication session or operation of the M2M device. The core network may send the security requirement to the M2M device without having received a security profile from the M2M device. The security requirement may include a security profile setting for one or more of the following: secure storage, secure execution, or integrity validation.

BRIEF DESCRIPTION OF THE DRAWINGS

A more detailed understanding may be had from the following description, given by way of example in conjunction with the accompanying drawings wherein:

FIG. 10 illustrates an exemplary network-initiated M2M device management call flow with gateway as a proxy connectivity.

DETAILED DESCRIPTION OF ILLUSTRATIVE EMBODIMENTS

A detailed description of illustrative embodiments may now be described with reference to the Figures. However, while the present invention may be described in connection with exemplary embodiments, it is not limited thereto and it is to be understood that other embodiments may be used or modifications and additions may be made to the described embodiments for performing the same function of the present invention without deviating therefrom. In addition, the figures may illustrate call flows, which are meant to be exemplary. It is to be understood that other embodiments may be used. The order of the flows may be varied where appropriate. Also, flows may be omitted if not needed and additional flows may be added.

Figure 1A:
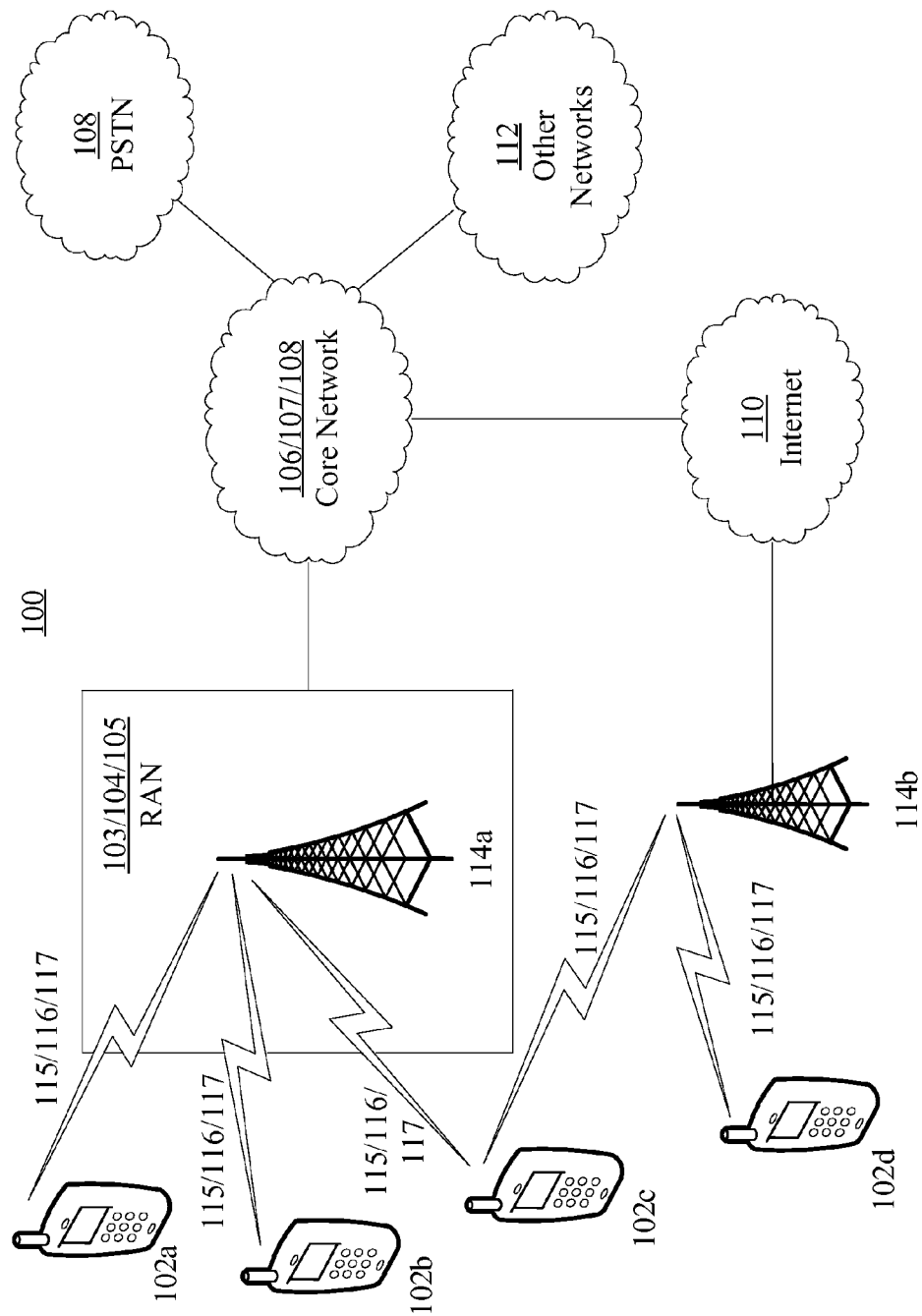
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
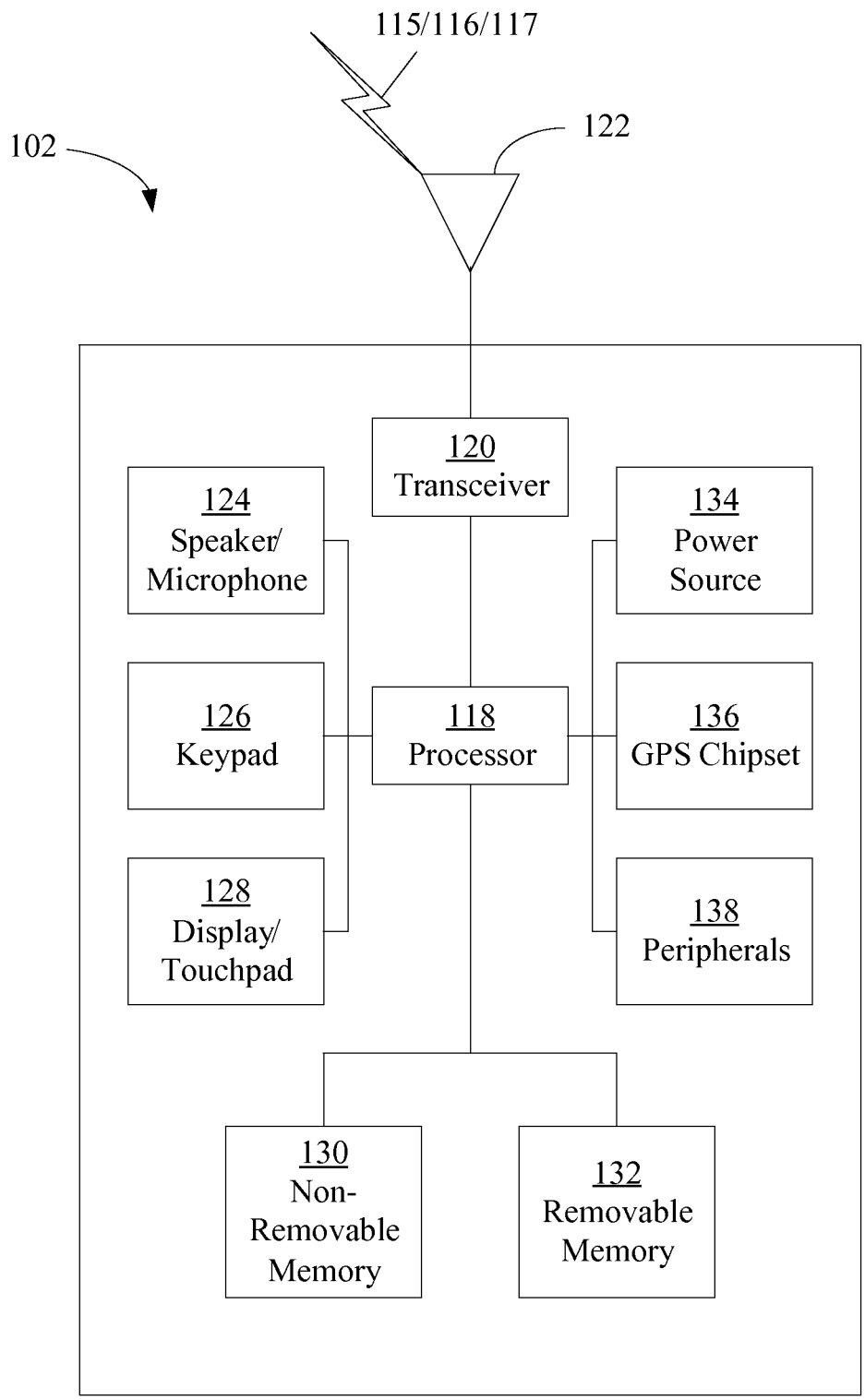
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
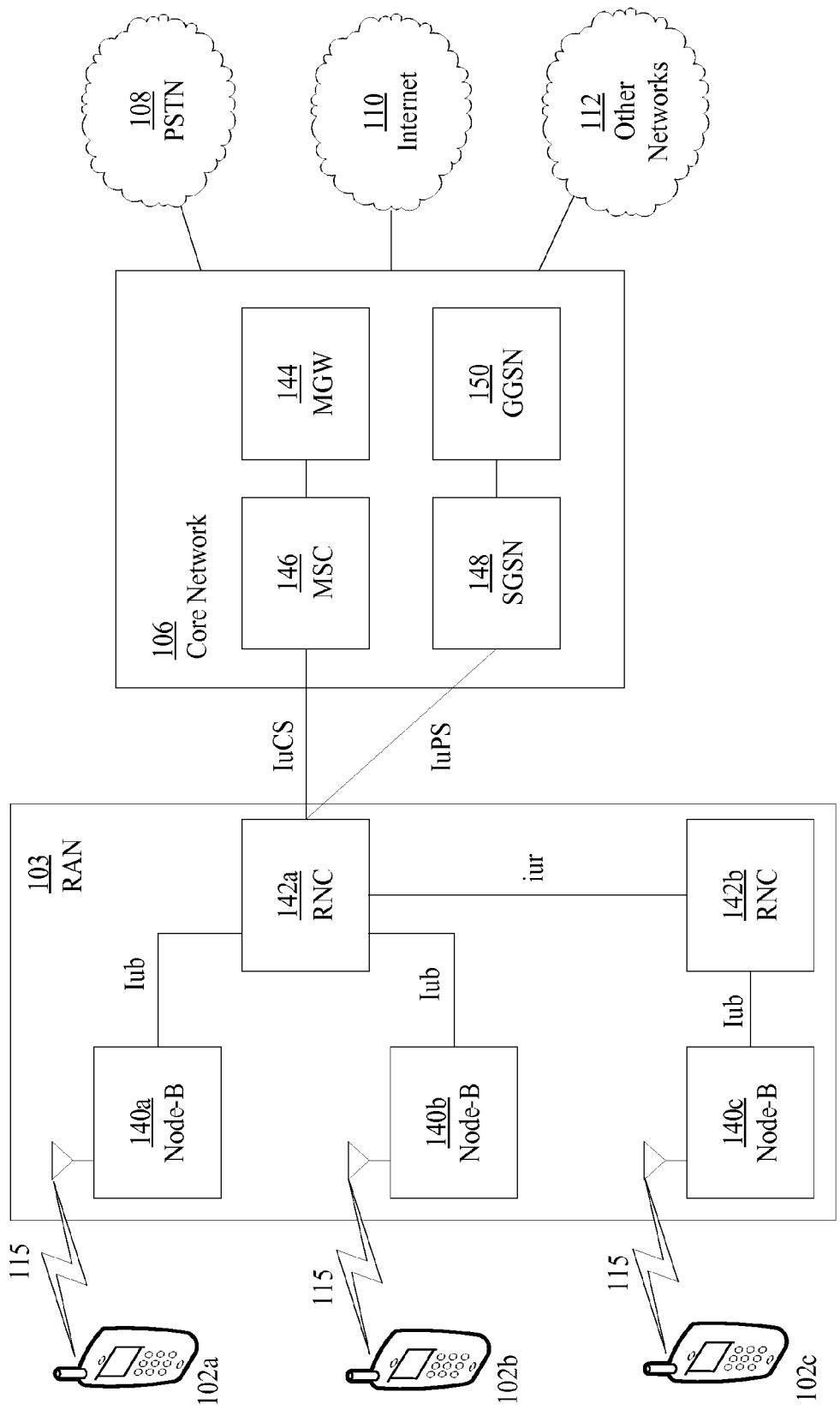
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
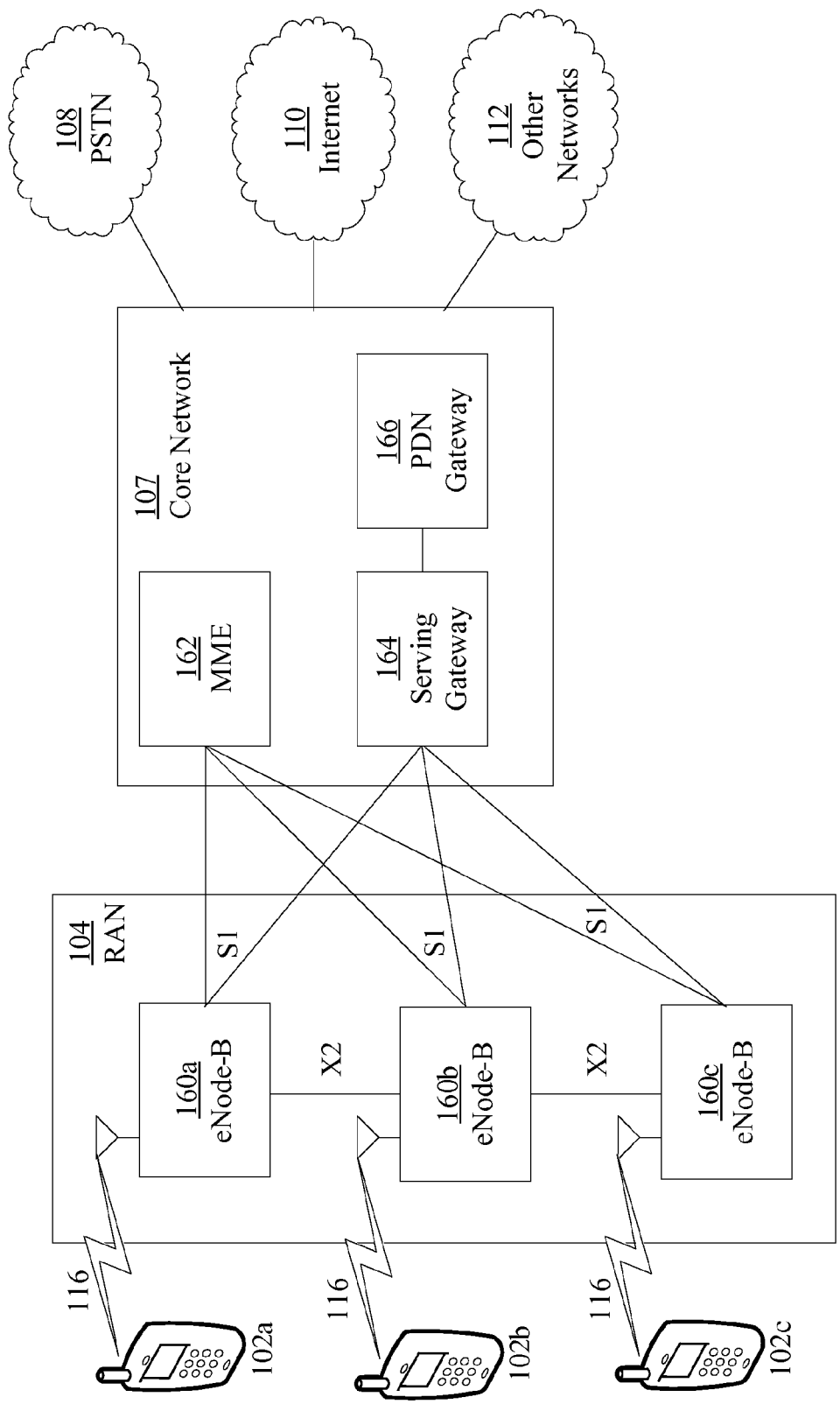
FIG. 1D is a system diagram of an another example radio access network and an another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
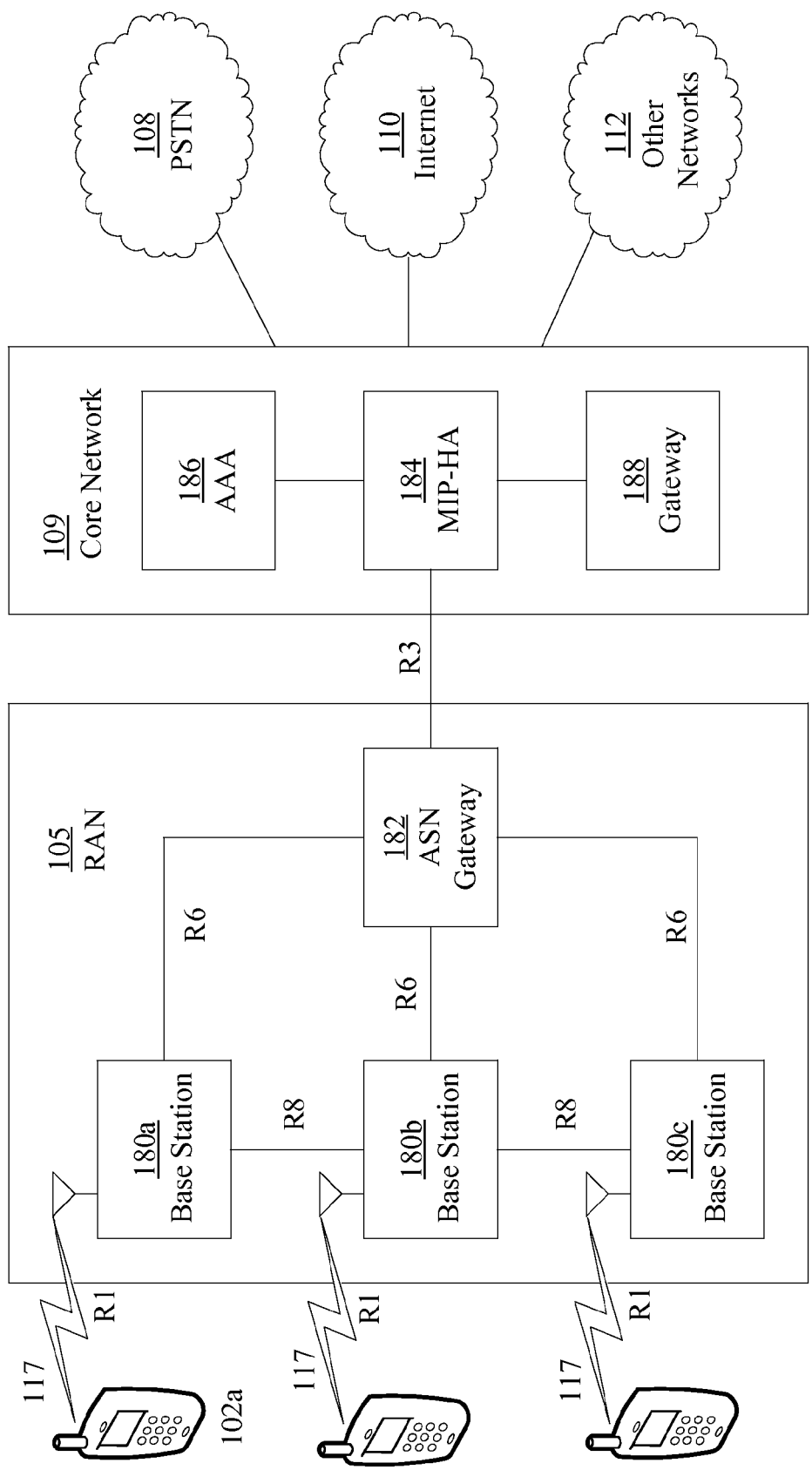
FIG. 1E is a system diagram of an another example radio access network and an another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems, methods, and instrumentalities are disclosed herein to provide secure operations in an M2M device. An M2M device may receive an indication that an operation to be performed is security sensitive. As an example, the operation may comprise generating a key for use in a communication session or for storage of information on the M2M device. The M2M device may determine that the operation is to be performed in a secure environment on the M2M device. The secure environment may be a secure execution environment, which may be a logically distinct portion of the M2M device.

The determination may be made in in accordance with a policy. For example, the M2M device may determine that the operation meets a requirement specified in the policy indicating that the operation is to be performed in the secure environment. The M2M device may perform the operation in the secure environment on the M2M device. The secure environment may be provided in a removable module (e.g., a module attached or connected to the M2M device). The M2M device may store a result relating to the operation in the secure environment.

The M2M device may send a security profile of the M2M device to a core network. For example, the M2M device may send the security profile to a service capability associated with the core network. The security profile may indicate to the core network the type and extent of security capability the M2M device supports. The M2M device may receive a response from the core network relating to the security profile. The response may include a security requirement for the M2M device to satisfy relating to a communication session or operation of the M2M device. The security requirement may include a security profile setting for one or more of the following: secure storage, secure execution, or integrity validation. A security profile setting may be specified for each of the applications, operations, or services to be performed on the M2M device, or, for one or more specific applications, operations, or services to be performed on the M2M device. The M2M device may adjust an indicated setting of the security profile to reflect the received value(s) of the specified security profile setting. The M2M device may produce a final security profile. The M2M device may send a final security profile to the core network to be used by the M2M device in the communication session or operation of the M2M device.

The M2M device may receive, from the core network, a security requirement for the M2M device to satisfy relating to a communication session or operation of the M2M device. The core network may send the security requirement to the M2M device without having received a security profile from the M2M device. The security requirement may include a security profile setting for one or more of the following: secure storage, secure execution, or integrity validation.

Exemplary Machine-to-Machine (M2M) call flows and system features are illustrated in ETSI TC M2M specification TS 102 690 v0.5.1., dated Jun. 15, 2010, which is incorporated herein by reference in its entirety.

An M2M system may include a functional architecture, which may comprise one or more of the following: Devices (types D and D'), Gateways (G), and M2M Core Network (N). There may be one or more Service Capabilities (SCs) for each of these 3 entities (D, G, or N).

Devices of type D may not communicate via a Gateway, so interactions between the Core and Device Applications may assume that there is no Gateway. Devices of type D' may not support SCs. Devices of type D' may rely on a Gateway's SCs for interactions with the M2M Network. D' devices may engage in authentication and secure communications with a Gateway. Interactions involving a Gateway may assume that the M2M Application is in the Gateway. This may include a case where the Gateway Application is self-contained and a case where the Gateway Application is a proxy for the D' Application. It may be (e.g., in future releases of ETSI TC M2M specifications) that devices of type D may be able to be served by a Gateway, but the M2M applications and SCs of such Devices may be directly exposed to the M2M Network. In such cases, the role of the Gateway may be to bridge between the M2M LAN and the wider-area access network used to provide M2M Devices and applications running on them access to the M2M Network.

Examples of SCs may include one or more of the following: SEcurity Capability (xSEC; x=D, G, or N), Reach-ability and Application Repository (xRAR), Generic Communication (xGC), Application Enablement (xAE), Remote Entity Management (xREM), History and Data Retention (xHDR).

One or more of the following features may be used in M2M architectures. For example, security features may be inserted into M2M call flows.

A security-sensitive operation (e.g., an operation regarding key generation/derivation on G or D or D') may be performed in a secure environment, such as a secure execution environment (SEE) or otherwise performed in a way that meets a pre-described (e.g., by a policy) secure execution (SE) requirement. A secure environment may be an embedded element of the M2M device or gateway. A secure environment may be a separate module attached or connected to the M2M device or gateway.

A cryptographic key generated, derived or otherwise obtained may be stored on G or D or D', in a secure storage environment (SSE) for example, or otherwise stored/protected in a way that meets pre-described secure storage (SS) requirements.

At Device registration time and/or at Application registration time, the Device (Gateway) may, using in-message parameters such as a devCharacteristic parameter, indicate to a NRAR (or GRAR, if the Gateway acts as a proxy of the network) information on the 1) secure storage (SS), 2) secure execution (SE), and 3) integrity validation (IV) that the Device (Gateway) supports.

A security profile may be created (e.g., a device security profile) that may specify the post-negotiation supported capabilities for Secure Storage (SS), Secure Execution (SE) and integrity validation (IV), during registration steps. Creation of a security profile may be performed during Security Association (SA) (e.g., at 12 in call flow C.1). Creation of a security profile may be distributed in the SA and subsequent Authorization processes.

The xSEC (Security Capability) may have an added function to, e.g., on its own initiation or in response to an inquiry from another Service Capability on the same entity or in response to an inquiry from an Application, indicate the 1) authentication status, 2) secure execution status for operations, 3) secure storage status for data/keys, and/or 4) integrity-validation status (e.g., results, interim data, status whether the procedure took place or not, etc) to such inquiring Service Capability or Application.

An indication may be provided, for example using existing parameters or newly added parameter, from NA, permeating through involved security capabilities, finally to Device (Gateway) or to DA/D'A (GA), that request such Device (Gateway) or applications running on them should store data on the Device (Gateway) securely.

A Device (Gateway) may send a Status indication from a Device Application that the data was indeed written and now is securely stored, which may go back to the data-write requesting Network Application.

A 'bulk-data' inbox may be created at NRAR so that a DRAR/GRAR may retrieve data from it on an in-bulk basis. There may be a secure-storage requirement indication and post-storage status indication exchanged on a bulk-basis, rather than per-message or per-data basis. In addition to an individual 'Data_ID' (which may be included as part of a message read/write/execute payload), the message formats may support carriage of a 'Data_Set_ID', for bulk data that consists of individual data each with its own Data_ID.

For xREM related call flows, one or more of the following may apply: assurances of the integrity status of the M2M Device/Gateway management (DM) capability (e.g., information stating that a dedicated DA/GA is operational) may be available as the network initiates a management procedure; the ability of the Device/Gateway or a dedicated DA/GA to perform such DM functions may be determined by a status update from the device; or previously obtained information about the ability of the Device/Gateway or a dedicated DA/GA to perform the DM functions may be stored in NRAR, and may be retrieved at the time that an NA needs to know if the Device/Gateway or a DA/GA may be capable of performing the required DA/GA functions.

One or more of the features disclosed herein may be used in M2M architectures. For example, security features may be illustrated with reference to the figures that follow.

When an M2M Device (or gateway) connects to the M2M Core, it may be required to authenticate itself, e.g., in order to get authorized to access the M2M Core. Each application in the M2M device (or gateway) may set up a session using independent application specific keys ($K_A$).

Figure 1F:
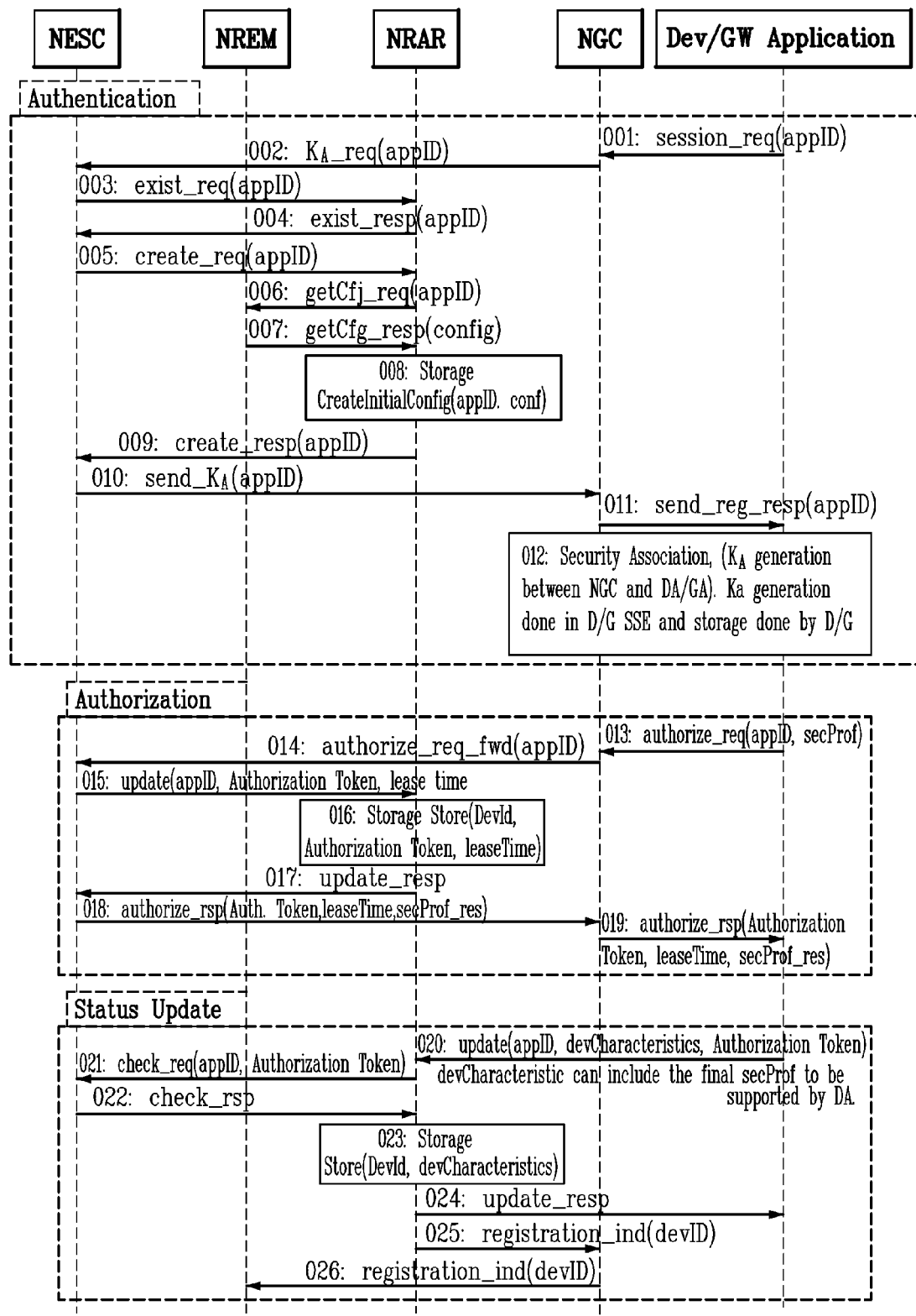
FIG. 1F illustrates an exemplary M2M device application and M2M gateway application registration.

FIG. 1F illustrates an exemplary M2M device application and M2M gateway application registration. For example, FIG. 1F illustrates a call flow for device application registration. Features and concepts that may be applied to the application registration may include one or more of the following.

Procedures (e.g., shown in boxes in call flow figures disclosed herein) or messages from/to DA/GA that require secure storage or secure execution may be required to be performed/handled by a secure storage environment (SSE) or secure execution environment (SEE), at D or G.

The capability of the device in terms of secure storage (SS), secure execution (SE), or integrity validation (IV) may be carried, in secProf format, on a devCharacteristic parameter sent from the DA to the Network (e.g., the NRAR SC of the Network).

The secProf information may be exchanged during security association (SA), e.g., at 12, and/or distributed between SA and subsequent Authorization process.

The actual security profile of the Device or Gateway may be determined in the Network by cross-referencing it to the Device/Gateway ID in a database. In such a case, it may not be necessary for the secProf to be included in the data exchanges between the Device and the Network.

The M2M Device Application registration procedure may be using an Authentication, an Authorization and a Status Update. Authentication may be performed at 001 through 012. At 001, the M2M application in the M2M device (or gateway) may contact NGC to setup a data session. At 002, NGC may contact NSEC to obtain an application key ($K_A$) for the specific application. At 003, NSEC may check if the application is already known by NRAR capability. At 004, If the application is already known, NRAR may return the Application ID (e.g., at 009) to NSEC. If not, NSEC may instruct NRAR to create it (e.g., at 005 through 009). At 005, Security Capability may request from NRAR the creation of a new entry for the device. At 006 and 007, NRAR may get the default configuration for the M2M Application from NREM. At 008, NRAR may store information related to the current M2M device (or gateway) application registration attempt. At 009, the create request may return an Application ID, e.g., that is generated by NRAR. At 010, NSEC may return the corresponding $K_A$ to NGC. At 011, the M2M device (or gateway) application registration result may be returned to the M2M Device (or gateway) Application. At 012, if a security association is required, NGC and M2M device (or gateway) application may setup a security association using key $K_A$.

Out of a security association process between the NSEC and D(G)SEC, the D(G)SEC may establish information on the security profile that was agreed between it and the NSEC that it will support during the session. This may include information about secure storage (SS), secure execution (SE), and integrity validation (IV) mechanisms that the D(G)A may be guaranteed by the D(G)SEC during this session. This per-session security profile information may be referred to as secProf.

Security-sensitive operations required for generation of Ka may be performed within one or more Secure Execution Environments (SEEs) on the Device(or Gateway if the Device functions as a Gateway for example)). Storage of Kr, Ks, and Ka may be handled in one or more Secure Storage Environment (SSE) of the Device (or Gateway if the Device functions as a Gateway). During this security association stage, the M2M DA(or GA) may include a session-level security requirement information.

Authorization may be performed at 013 through 019. At 013 and 014, the M2M Device (or gateway) Application may contact NGC, which may contact NSEC to get authorization to access the M2M core layer. When the D(G)A sends authorization request, it may retrieve the secProf information from the D(G)SEC and sends it along with the DevID, to NGC. This information, secProf, may then be forwarded to NSEC, and can be used for NSEC to determine a Device (or gateway) Application profile and construction of an Authorization Token and associated Lease Time. The secProf information may be such that it is a single-piece of information that applies to each application for the entity (Device or Gateway), or, there may be multiple secProfs, e.g., available per individual application or groups of applications, etc. When the DA(GA) retrieves the secProf at 13, it may retrieve the application (or application-group) specific secProf. The post-retrieval transfer and further use of such application or application-group specific secProfs may permeate through the rest of the protocol.

At 015 through 017, NSEC may update the M2M Device (or gateway) Application profile, adding its Authorization Token and associated Lease Time. LeaseTime may be infinite for M2M Device (or gateway) Application, such as one that cannot afford authorization expiration (e.g., eHealth use cases).

At 018 and 019, NSEC may return the Authorization Token and associated Lease Time to the NGC, which may forward it to the M2M Device (or gateway) Application. If the Lease Time has expired, the M2M Device (or gateway) Application may be required to renew its Authorization Token by running the same exchanges described at 0013 through 019. At 18, the NSEC may include a secProf_res, a parameter that indicates what it requires for the D(G)A in terms of device security profiles settings for secure storage (SS), secure execution (SE), and/or integrity validation (IV), for that D(G)A to meet during the session. At 19, the NGC may forward this information back to the D(G)A. The secProf_res information may be application or application-group specific, e.g., rather than being a single piece of information that applies commonly to all applications.

Status update may be a process that sets an indication that the M2M Device (or gateway) Application is reachable and online. Status update may be performed at 020 through 026.

The M2M Device (or gateway) Application may unregister itself when going offline. At 020, the M2M Device (or gateway) Application may update its profile by issuing a single or multiple (as required) update request(s) to NRAR.

At 20, the parameter devCharacteristic may include secProf_fin that the D(G)A may finally support and be guaranteed by D(G)SEC during the session. This information may, for example, indicate the to-be-guaranteed security capabilities regarding Secure storage (SS) or execution (SE) and/or type/method of Integrity Validation (IV). This secProf_fin parameter may be application or application-group specific, e.g., rather than being a single piece of information commonly application to all applications.

The exchange of indicators for offered (at 013), required (at 018-19), and finally supported (at step 020) secProf may be subsumed as part of an (expanded) security association step described at 12.

At 021 and 022, upon receipt, NRAR may validate the Authorization Token by contacting NSEC. At 023, NRAR may update the M2M Device (or gateway) Application profile, and, at 24, may return the registration result to the M2M Device (or gateway) Application. At 025, NRAR may inform NGC about an M2M Device (or gateway) Application being online. At 026, NGC may inform NREM about an M2M Device (or gateway) Application being online.

Figure 2:
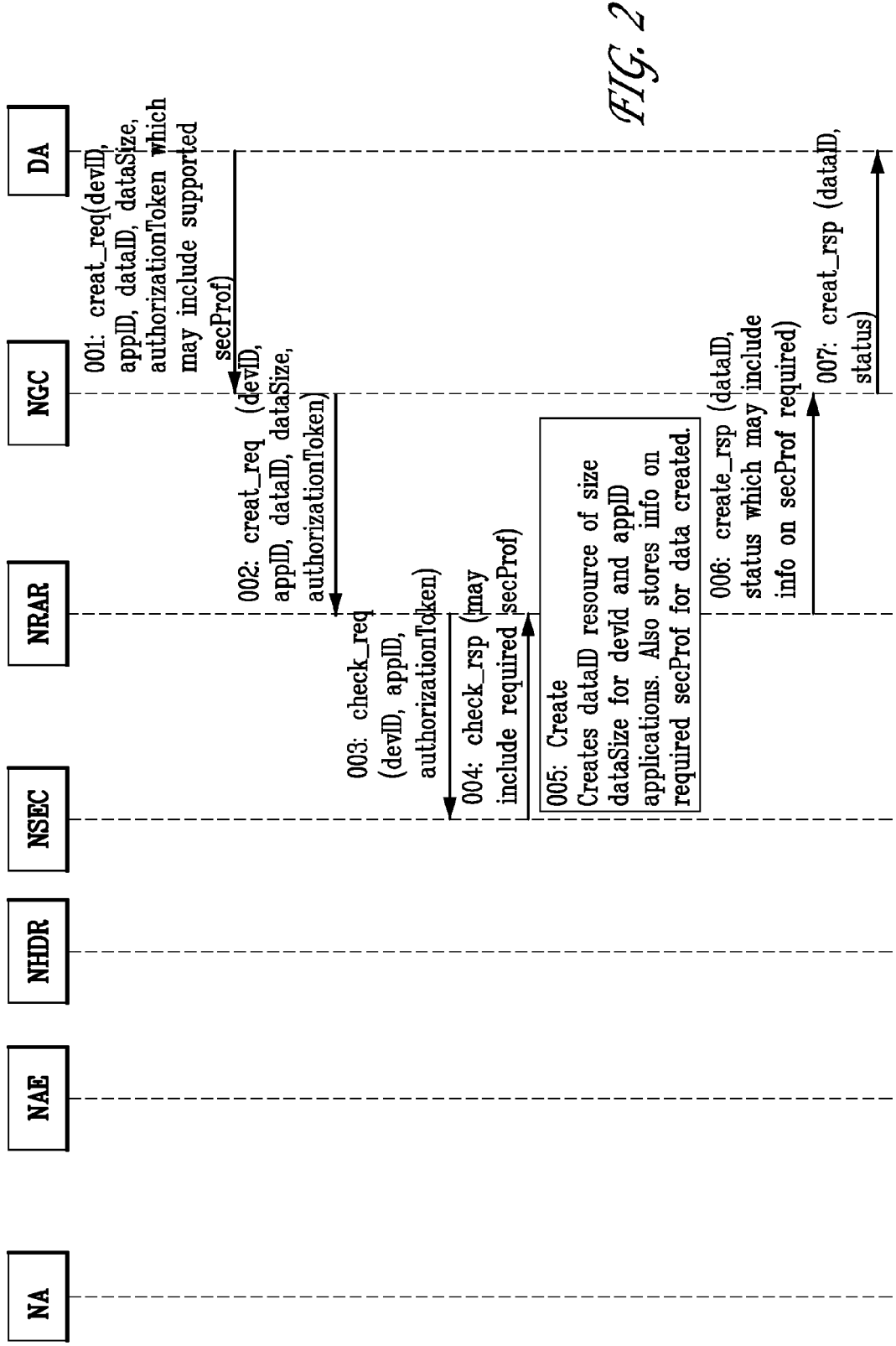
FIG. 2 illustrates an exemplary call flow for device application resource creation.

The disclosed systems, methods, and instrumentalities may relate to M2M device application resource creation. An M2M resource may be created as a container for the information to be exposed by the DA, which may conform to the call flow of FIG. 2. For example, FIG. 2 illustrates an exemplary call flow for device application resource creation. Features that may be applied to application resource creation and deletion may include one or more of the following.

Information may be exchanged about a security profile (e.g., regarding SS, SE, and/or IV) supported for the data (e.g., from DA to NSEC), required for the data (e.g., from NSEC to NRAR to DA), and storage of such information at NRAR.

The actual security profile of the Device or Gateway may be determined in the Network by cross-referencing it to the Device/Gateway ID in a database. In such a case, it may not be necessary for the secProf to be included in the data exchanges between the Device and the Network.

An entity in the Network, e.g., NRAR, may make a go-no-go decision on whether or not to create the resource at the Device, based on the actual security profile supported by the Device/Gateway. Such a security profile may be applicable commonly to resources, or may be resource or group-of-resource specific. In an example for the latter case, there may be multiple security profiles, each specific to an individual resource or group-of-resources.

At 001 through 002, the DA may issue a creation request to NRAR through NGC. The creation request may include information on a supported security profile (secProf) for the resource to be created. This information may be carried in the Authorization Token.

NRAR may contact NSEC to authenticate the M2M Device and check that it is authorized to create a data container on that particular NA. The check_resp at 004 may include a secProf that may be required, as determined by NSEC, for that particular data. NRAR may create the data container. NRAR may also include, in the data container, information on the required secProf for the data/resource. The create operation result may be returned to the DA, though NRAR and NGC. The required secProf information may be forwarded from NRAR, via NGC, to D(G)A.

Exceptions may include one or more of the following. At 001, a creation request timeout or rejection by NGC. There may be no response for timeout or read response with reject cause. At 002, a creation request timeout or rejection by NRAR. There may be no response for timeout or read response with reject cause. At 003, a Check request timeout or rejection by NSEC. There may be no response for timeout or check response with reject cause. At 005, a bad creation request to NRAR, e.g., invalid data size.

M2M device application resource deletion may be described in ETSI TC M2M specification TS 102 690 v0.5.1., dated Jun. 15, 2010, e.g., Annex C.3.2. The disclosed systems, methods, and instrumentalities may relate to M2M device application resource deletion, e.g., deletion of an existing M2M resource previously created by a DA.

Even though device applications may request an explicit resource deletion, other policies for resource deletion may be chosen (e.g., at resource creation or determined by the M2M Core or network application). The process for deletion of the data may include exchange of secProf information between the DA and NSEC, as well as deletion of previously created and stored secProf information at NRAR.

The actual security profile of the Device or Gateway (or the resource-specific security profile specific to a resource intended to be created for a Device or Gateway) may be determined in the Network by cross-referencing it to the Device/Gateway ID and any other relevant information in a database. In such a case, it may not be necessary for the secProf to be included in the data exchanges between the Device and the Network.

M2M network application resource creation and deletion may be described in ETSI TC M2M specification TS 102 690 v0.5.1., dated Jun. 15, 2010, e.g., Annex C.4.1 and C.4.2. The disclosed systems, methods, and instrumentalities may relate to M2M network application resource creation and deletion. Creation and deletion of resources at an NA may include steps for creation and exchange of secProf between NA and NSEC, and storage of such information on NRAR. Similar to what was described earlier in the contexts of Application Registration and Resource Creation call flows, the secProf may be modulated so that it may be 'tuned' to prospective D(G)A or deviceCharacteristic or service_classes that may be supported by a prospective D(G)A and may be considered in the creation/deletion of the secProf for this NA-specific resource. If the NA-based created resource (data) is later shared (e.g., read by, or executed by) a D(G)A, then the existing secProfile associated with this data (and this record is to be stored in NRAR) may be retrieved, and applied directly to D(G)A, and/or used as a 'baseline' for new negotiation for secProf to be newly created for the D(G)A.

The actual security profile of the Device or Gateway (or specific security profile for Resource on Device or Gateway) may be determined in the Network by cross-referencing it to the Device/Gateway ID or other relevant information in a database. In such a case, it may not be necessary for the secProf to be included in the data exchanges between the Device and the Network.

An entity in the Network, e.g., NRAR, may make a decision on whether or not to create a resource in a Device or Gateway, based on the actual security profile supported by the Device/Gateway.

The disclosed systems, methods, and instrumentalities may relate to an M2M Network Application to M2M Device Read. When an NA reads a value in an M2M Device, the operation may conform to existing call flows (e.g., TS 102 690 v0.5.1., dated Jun. 15, 2010, Annex C.5.1 and C.5.2). The following two cases may be distinguished: 1) if the device is offline or if an immediate interaction with the device is not required; and, 2) if the device is always connected and an immediate interaction is needed or if the data claimed by the NA is not available in NRAR (e.g., not cached).

One or more of the following may be implemented with an M2M Network Application to M2M Device Read. As part of a READ request, the NA may request confirmation from the Device (Gateway) or DA (GA) that the data it reads is read from a secure storage that meets Secure Storage (SS) requirements, e.g., as set forth in security profile (secProf). As part of the READ status report, the Device (Gateway) or DA (GA) may send a confirmation message indicating that the data the NA is reading is read from a secure storage meeting SS requirement set forth in security profile (secProf). The actual security profile of the Device or Gateway may be determined in the Network by cross-referencing it to the Device/Gateway ID and/or other relevant information in a database. In such a case, it may not be necessary for the secProf to be included in the data exchanges between the Device and the Network. An entity in the Network, e.g., NRAR, may make a go-no-go decision on whether to proceed with the read operation, based on the actual security profile supported by the Device/Gateway.

The disclosed systems, methods, and instrumentalities may relate to an M2M Network Application to M2M Device Write. When an NA updates a value in an M2M Device, the operation may conform to existing call flows (e.g., TS 102 690 v0.5.1., dated Jun. 15, 2010, Annex C.6). The following two cases may be distinguished: 1) if the device is offline or if an immediate interaction with the device is not required; and 2) if the device is always connected and an immediate interaction is needed.

One or more of the following may be implemented with an M2M Network Application to M2M Device Write. An indication may be sent from NA, through involved security capabilities, to the Device, of a requirement to store the data on Device securely. Provide a requirement that ensures that requested data is actually stored in a secure storage environment meeting SS requirements, e.g., as set forth in a secProf. Provide a status indication from the Device Application that the data was indeed written and is securely stored, which may include going back to the Network Application. The status indication may be created by a trusted entity within the Device/Gateway and may be unique and verifiable. Additionally, in the existing protocol call flow, the post-write status update may be sent 'per message.' This may imply that if the NRAR inbox had a large amount of data, then the DA may need to repeatedly send a 'per-message' post-write status update. A 'bulk status report,' may be provided since the DA may be able to read the NRAR inbox in bulk. A post-write status report in bulk may be sent. For this to be possible, the protocol may need to support 'Data_Set_ID', for bulk data that consists of individual data each with its own Data_ID. The actual security profile of the Device or Gateway may be determined in the Network by cross-referencing it to the Device/Gateway ID in a database. In such a case, it may not be necessary for the secProf to be included in the data exchanges between the Device and the Network. An entity in the Network, e.g., NRAR, may makes a go-no-go decision on whether to proceed with writing to the Device/Gateway, e.g., based on the actual security profile supported by the Device/Gateway.

Figure 3:
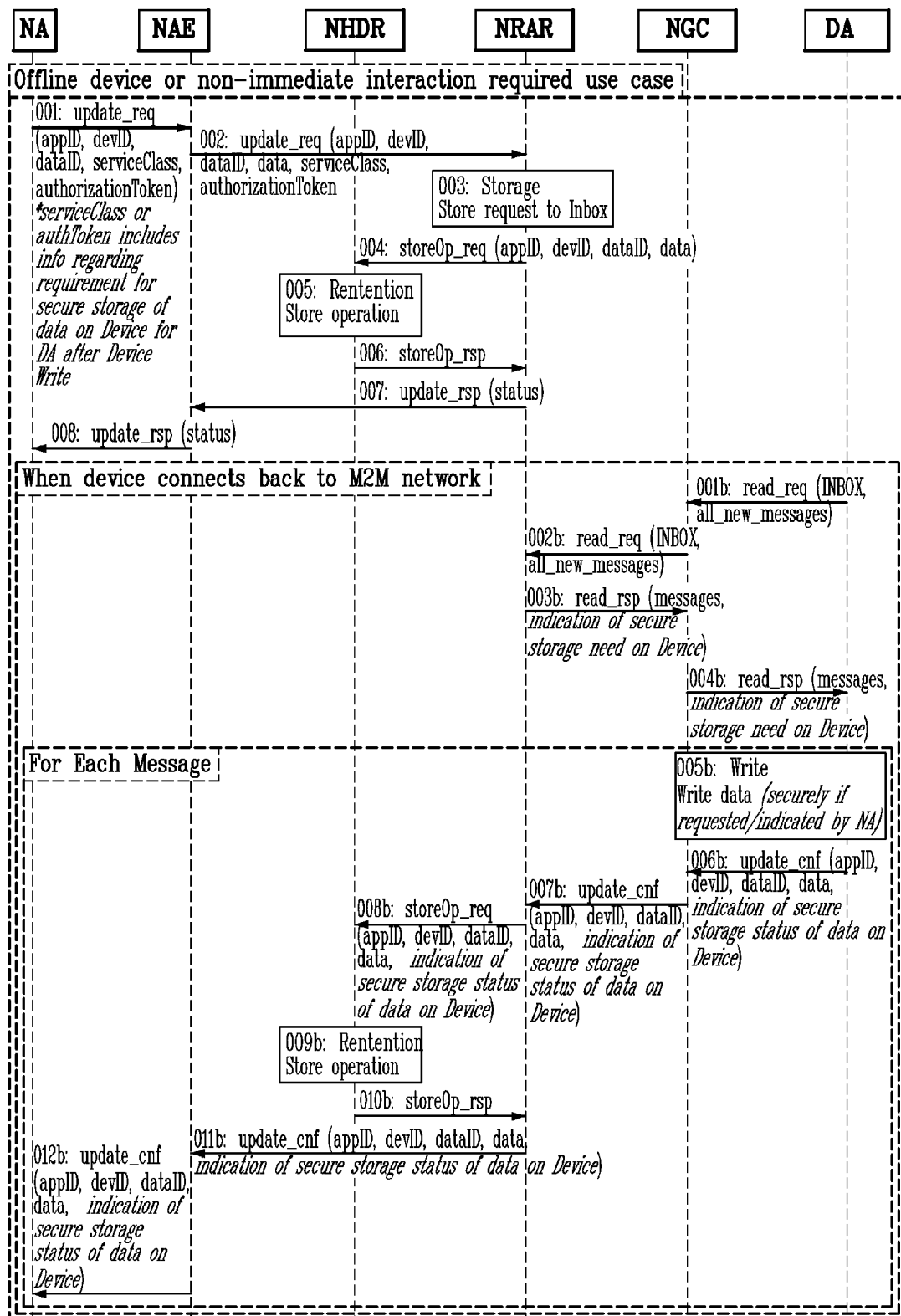
FIG. 3 illustrates exemplary call flows for a network application to device write call flow in an offline device use case.

FIG. 3 illustrates exemplary call flows for a network application to device write call flow in an offline device use case. At 001, the NA may contact NAE to issue an update request to a M2M Device. A serviceClass or authToken may include information regarding requirements for secure storage of data on the Device for DA after Device Write. At 002, after having authenticated and ensured that the NA is authorized to issue the request, NAE may contact NRAR to execute the request. At 003, NRAR may check that the parameters are writable and store the request in the Device's INBOX (otherwise, an exception may be returned). At 004 through 006, NRAR may instruct NHDR to store the exchange. At 007 and 008, the update operation result may be returned to the NA through NAE. The status parameter may indicate that the actual operation execution has been delayed.

When the device connects back to the M2M network (e.g., wakes up), it may retrieve pending requests from INBOX and process them, which may comprise one or more of the following. At 001b and 002b, the NRAR may be contacted through the NGC. At 003b and 004b, the DA may retrieve pending messages, and, an indication may be provided that secure storage is needed.

The call flows 005b through 012b may be associated with each message. At 005b, the DA may update the proper value when processing the message. This may be performed securely, e.g., if requested or indicated by NA. At 006b-007b, operation execution may be confirmed by the DA to NRAR going through NGC. An indication of a secure storage status of data on the Device may be provided. At 008b-010b, the operation may be stored by NHDR, e.g., upon request from NRAR. At 008b, an indication of a secure storage status of data on the Device may be provided. At 011b and 012b, the actual operation execution by the DA may be confirmed to the NA, e.g., based on serviceClass specified in the original request, and, an indication of a secure storage status of data on the Device may be provided.

One or more of the following exceptions may be provided from the network application side. An update request may timeout or be rejected by NAE. There may be no response for timeout or update response with reject cause. An update request may timeout or be rejected by NRAR. There may be no response for timeout or update response with reject cause. A store request may timeout or be rejected by NHDR. There may be no response for timeout or store response with reject cause.

One or more of the following exceptions may be provided from the device application side. A read request may timeout or be rejected by NGC. There may be no response for timeout or read response with reject cause. A read request may timeout or be rejected by NRAR. There may be no response for timeout or read response with reject cause. A store request may timeout or be rejected by NHDR. There may be no response for timeout or store response with reject cause.

The status indication may be created by a trusted entity within the Device/Gateway and may be unique and verifiable. An entity in the Network, e.g., NRAR, may make a go-no-go decision on whether to proceed with writing to the Device/Gateway, based on the actual security profile supported by the Device/Gateway.

Figure 4:
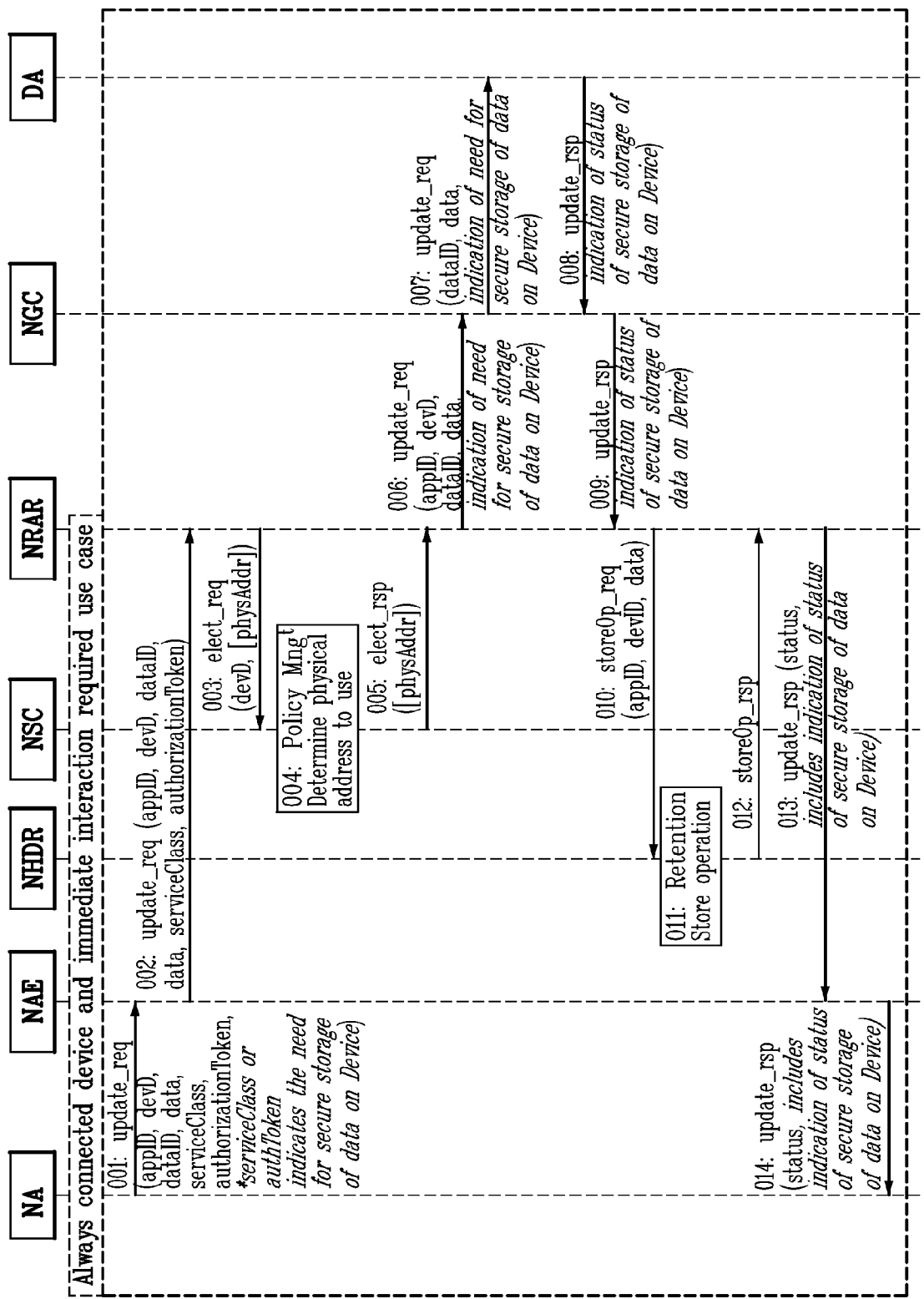
FIG. 4 illustrates exemplary call flows for a network application to device write call flow in an online device use case.

FIG. 4 illustrates exemplary call flows for a network application to device write call flow in an online (e.g., connected) device use case. If an NA requires writing a value on an always connected device and if an interaction with the device is required, one or more of the following may takes place. At 001, the NA may issue an update request to NAE. A serviceClass or authToken may include information regarding requirements for secure storage of data on the Device. At 002, after having authenticated and ensured that the NA is authorized to issue the request, the NAE may forward the request to NRAR for processing. At 003 through 005, NRAR may contact NCS to determine which communication interface to use for interacting with the M2M Device. At 006 through 009, NRAR may deliver the update request to the DA through NGC, which may choose the network based on quality of service (QoS) amongst some other policies with respect to the serviceClass. An indication of a secure storage status of data on the Device may be provided in one or more of the call flows. At 010 through 012, NRAR may instruct NHDR to store the exchange. At 013 and 014, NRAR may confirm to the NA through NAE that the update has been processed. An indication of a secure storage status of data on the Device may be provided in one or more of the call flows.

One or more of the following exceptions may be provided. An update request may timeout or be rejected by NAE. There may be no response for timeout or update response with reject cause. An update request may timeout or be rejected by NRAR. There may be no response for timeout or update response with reject cause. An elect request may timeout or be rejected by NCS. There may be no response for timeout or elect response with reject cause. An update request may timeout or be rejected by NGC. There may be no response for timeout or update response with reject cause. An update request may timeout or be rejected by a device application. There may be no response for timeout or update response with reject cause. A store request may timeout or be rejected by NHDR. There may be no response for timeout or store response with reject cause.

The disclosed systems, methods, and instrumentalities may relate to an M2M Network Application to M2M Device Write/Execute. When an NA triggers an action execution on a M2M Device, it may conform to existing call flows. The following two cases may be distinguished: 1) if the device is offline or if an immediate interaction with the device is not required; and, 2) if the device is always connected and an immediate interaction is needed.

One or more of the following may be implemented with an M2M Network Application to M2M Device Write/Execute. Additional information on update_req may be provided and may include information on a need for device-side 1) security storage and/or 2) secure execution, e.g., carried in serviceClass and/or authorizationToken, or secProf included as part of either existing parameters.

The figures herein described may illustrate additional SE (secure execution) or SS (secure storage) insertions. The status indication may be created by a trusted entity within the Device/Gateway and may be unique and verifiable. An entity in the Network, e.g. NRAR, may make a go-no-go decision on whether to proceed, e.g., based on the actual security profile supported by the Device/Gateway.

Figure 5:
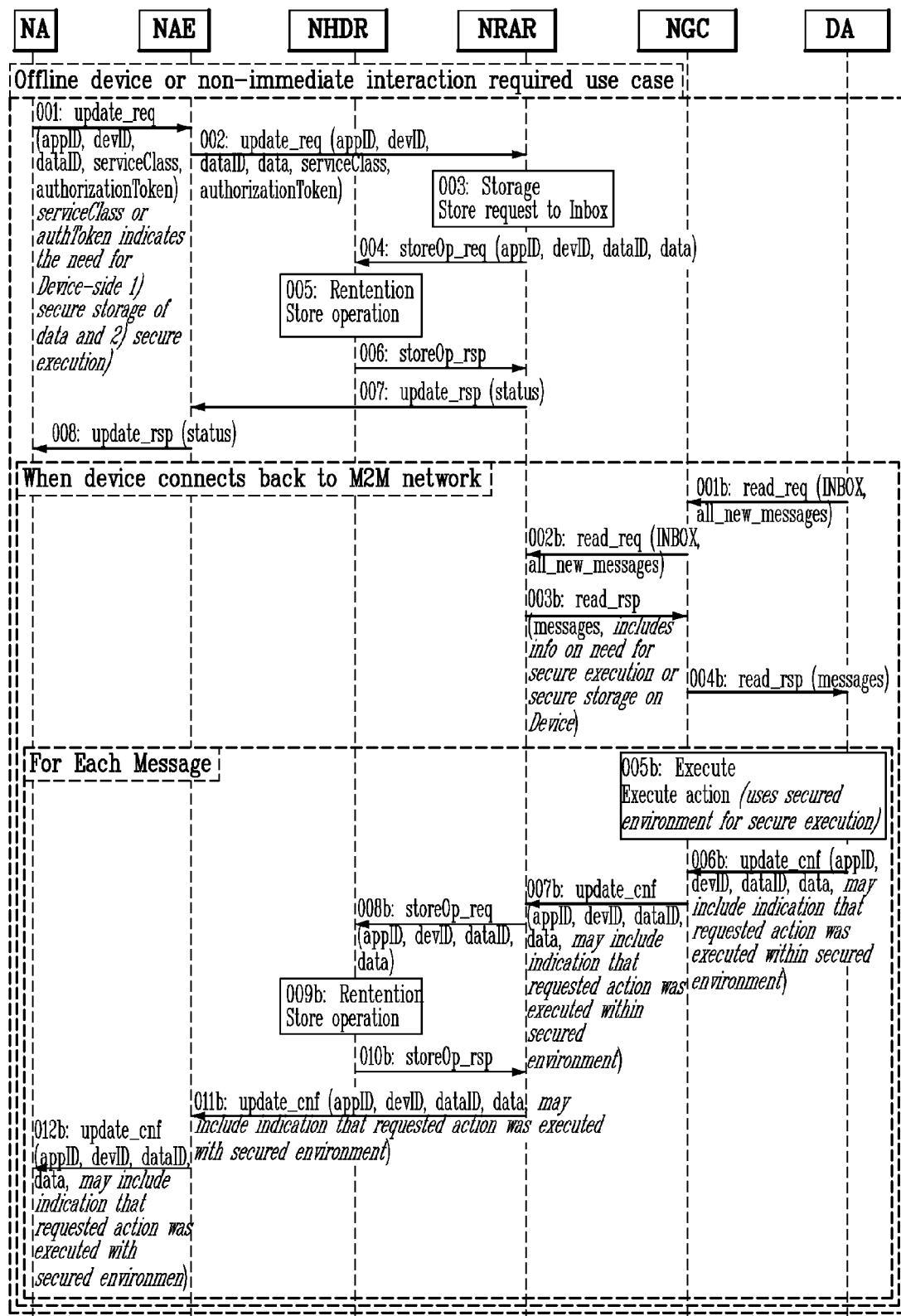
FIG. 5 illustrates an exemplary network application to device write/execute call flow in an offline case.

FIG. 5 illustrates an exemplary network application to device write/execute call flow in an offline case.

If an NA is required to execute an action on an offline device or in the event the M2M core determines no interaction with the device is required, one or more of the following call flows may apply: At 001, the NA may contact NAE to issue an update request to a M2M Device. A serviceClass or authToken may indicate a need for Device side secure storage of data and/or secure execution. At 002, after having authenticated and ensured that the NA is authorized to issue this request, NAE may contact NRAR to execute the request. At 003, NRAR may check that the parameters are executable and may then store the request in the Device's INBOX. Otherwise, an exception may be returned. At 004 through 006, NRAR may instruct NHDR to store the exchange. At 007 and 008, the update operation result may be returned to the NA through NAE. The status parameter may indicate the actual operation execution has been delayed.

When the device wakes up, it may retrieve pending requests from INBOX and process them, e.g., as described in one or more of the following call flows. At 001*b*→004*b*, NRAR may be contacted through NGC, and, the DA may retrieve pending messages. One or more call flows may include information on the need for secure execution and/or storage on the Device. At 005*b*, for each message retrieved, the DA may execute the relevant action when processing the message, and, may use a secure environment for secure execution. At 006*b* and 007*b*, the operation execution may be confirmed by the DA to NRAR going through NGC, and, may include an indication that the requested action was executed in the secured environment. At 008*b*-010*b*, The operation may be stored by NHDR upon request from NRAR. At 011 and 012, the actual operation execution by the DA may be confirmed to the NA, e.g., based on serviceClass specified in the original request, and, may include an indication that the requested action was executed in the secured environment.

One or more of the following exceptions may be provided from the network application side. An update request may timeout or be rejected by NAE. There may be no response for timeout or update response with reject cause. An update request may timeout or be rejected by NRAR. There may be no response for timeout or update response with reject cause. A store request may timeout or be rejected by NHDR. There may be no response for timeout or store response with reject cause.

One or more of the following exceptions may be provided from the device application side. A read request may timeout or be rejected by NGC. There may be no response for timeout or read response with reject cause. A read request may timeout or be rejected by NRAR. There may be no response for timeout or read response with reject cause. A store request may timeout or be rejected by NHDR. There may be no response for timeout or store response with reject cause.

Call flows for a network application to device write/execute in a connected case may be similar to the offline case.

The disclosed systems, methods, and instrumentalities may relate to an M2M Device Application to M2M Network Application Read. When a DA reads a value in a NA, it may conform to the call flows relating to FIG. 6.

Conditions for existing call flows may imply that the NRAR in general does not know whether the DA has been authenticated by NRAR, and so may normally have to request that info from the NSEC. A functionality for the xSEC (x=G, D, or N) capability may be used in this case. The functionality is that the xSEC function may, either by its own initiation or in response to a request from an application (xA) or from another xSC, inform the xA or xSC whether a DA is authenticated or not.

This functionality of xSEC may be generalized. For example, what the xSEC may 'inform,' either initiated by itself or in response to requests (from an xA or xSC), may include status information for other security-related procedures such as integrity validation (IV), authorization, key derivation, secure storage, etc., and/or non-security related functions such as simple READ, WRITE, or Execute, etc. A generalization may be that it does not necessarily have to be the xSEC. Other xSC's (e.g., xREM, xRAR, xGC, etc.) may benefit from new additional functionality that may require such a xSC to be able to inform, again for example, either initiated by itself or in response to a xA or ySC (e.g., where y is not x).

Figure 6:
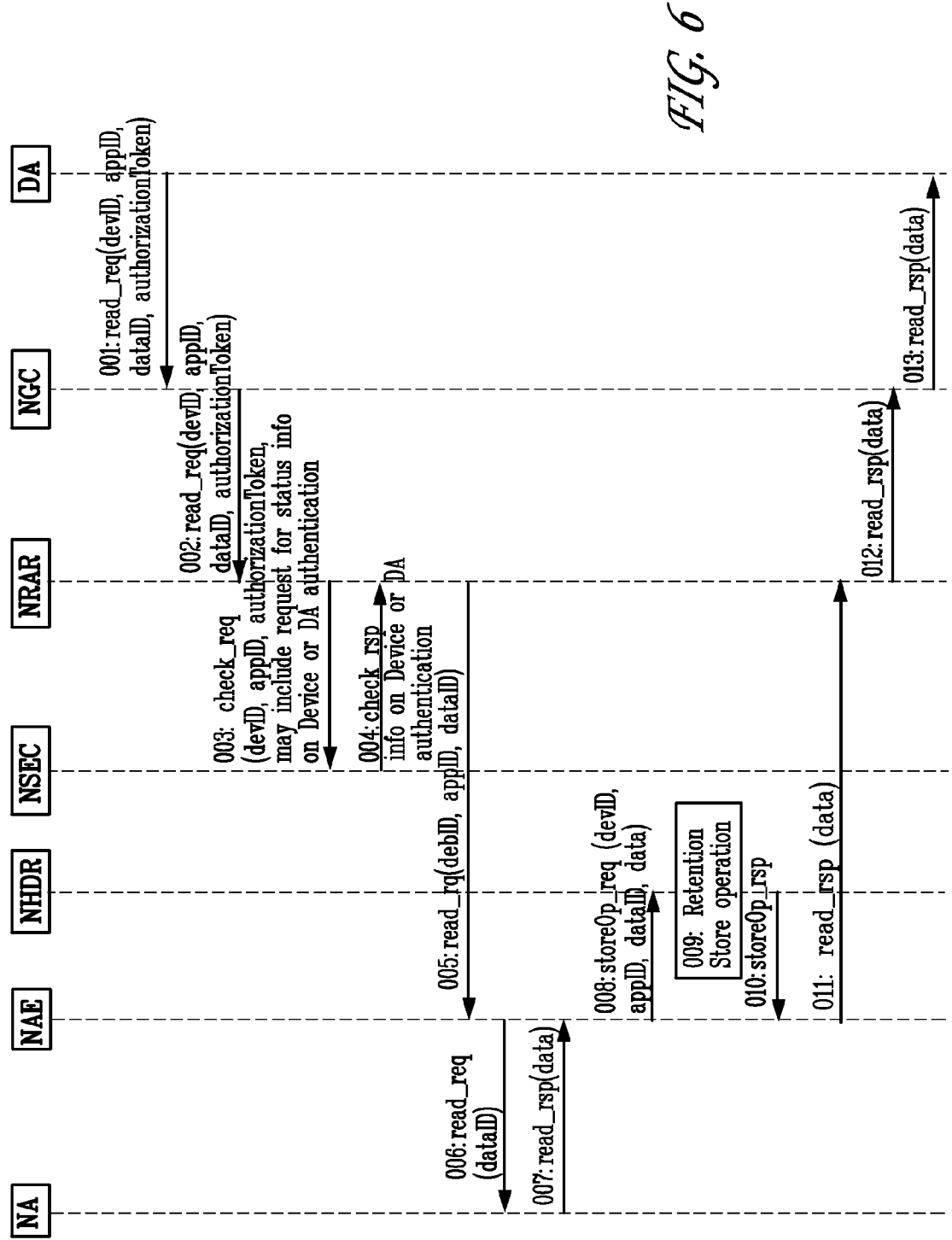
FIG. 6 illustrates an exemplary device to network application read call flow.

FIG. 6 illustrates an exemplary device to network application read call flow. At 001 and 002, the DA may issue a read request to NRAR through NGC. At 003 and 004, NRAR may contact NSEC to authenticate the M2M Device and check that it is authorized to read data on that particular NA, and/or may contact NSEC to check the status of M2M Device authentication or M2M D(G)A authentication. It may be the NSEC that may initiate the transfer of the authentication status information to NRAR. At 003, the call flow may include a request for status information on Device or DA authentication. At 004, the call flow may include information on Device or DA authentication. At 005, NRAR may forward the request to NAE. At 006 and 007, NAE may send the read request to the NA and get its reply. At 008 through 010, NAE may instruct NHDR to store the exchange. At 010 through 013, the read operation result may be returned to the DA, though NRAR and NGC.

One or more of the following exceptions may be provided. At 001, a read request may timeout or be rejected by NGC. There may be no response for timeout or read response with reject cause. A read request may timeout or be rejected by NRAR. There may be no response for timeout or read response with reject cause. A check request may timeout or be rejected by NSEC. There may be no response for timeout or check response with reject cause. A read request may timeout or be rejected by NAE. There may be no response for timeout or read response with reject cause. A read request may timeout or be rejected by network application. There may be no response for timeout or read response with reject cause. A store request may timeout or be rejected by NHDR. There may be no response for timeout or store response with reject cause.

Figure 7:
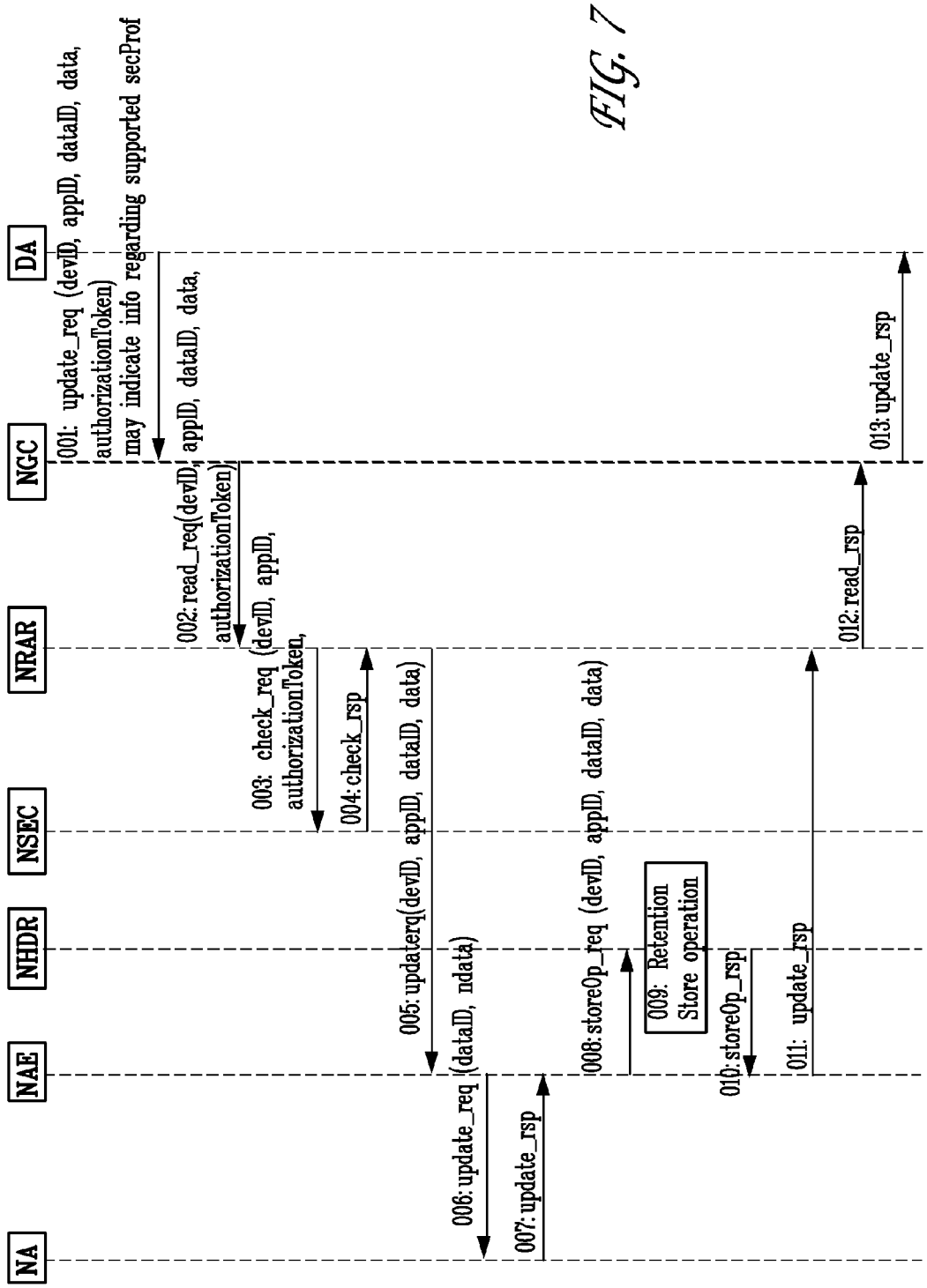
FIG. 7 illustrates an exemplary M2M device application to M2M network application write call flow.

FIG. 7 illustrates an exemplary M2M device application to M2M network application write call flow. When a DA updates a value in a NA, it may conform to call flows in FIG. 7.

One or more of the following may be implemented with an M2M Device Application to M2M Network Application Write. The D(G)A may indicate, e.g., in an update_req, a supported secProf. Authentication and secure communications between DA and NGC, involving NSEC, may be shown between 003 and 004. An explicit requirement for secure storage, for Kr, Ks, Ka, as well as perhaps a requirement for SS for an authorization token or other data, may be indicated to the network. Indicate a secure execution requirement for authentication and secure communication, e.g., at 003 and 004. The actual security profile of the Device or Gateway may be determined in the Network by cross-referencing it to the Device/Gateway ID in a database. In such a case, it may not be necessary for the secProf to be included in the data exchanges between the Device and the Network. An entity in the Network, e.g. NRAR, may make a go-no-go decision on whether to proceed, based on trustworthiness of (e.g., the actual security profile supported by) the Device/Gateway.

At 001 and 002, the DA may issue an update request to a NA by contacting NRAR through NGC. At 001, the DA may include, in the update_req message, information that may indicate information regarding suggested/required a secProf applicable to the executable data. At 003 and 004, NRAR may contact NSEC to authenticate the DA and check that it is authorized to modify data on that particular NA. At 005, NRAR may forward the request to NAE. At 006 and 007, NAE may send the update request to the NA. At 008 through 010, NAE may instruct NHDR to store the exchange. At 011 through 013, the update operation result may be returned to the DA through NRAR and NGC.

One or more of the following exceptions may be provided. An update request may timeout or be rejected by NGC. No response for timeout or update response with reject cause. An update request may timeout or be rejected by NRAR. There may be no response for timeout or update response with reject cause. A check request may timeout or be rejected by NSEC. There may be no response for timeout or check response with reject cause. An update request may timeout or be rejected by NAE. There may be no response for timeout or update response with reject cause. An update request may timeout or be rejected by network application. There may be no response for timeout or update response with reject cause. A store request may timeout or be rejected by NHDR. There may be no response for timeout or store response with reject cause.

Figure 8:
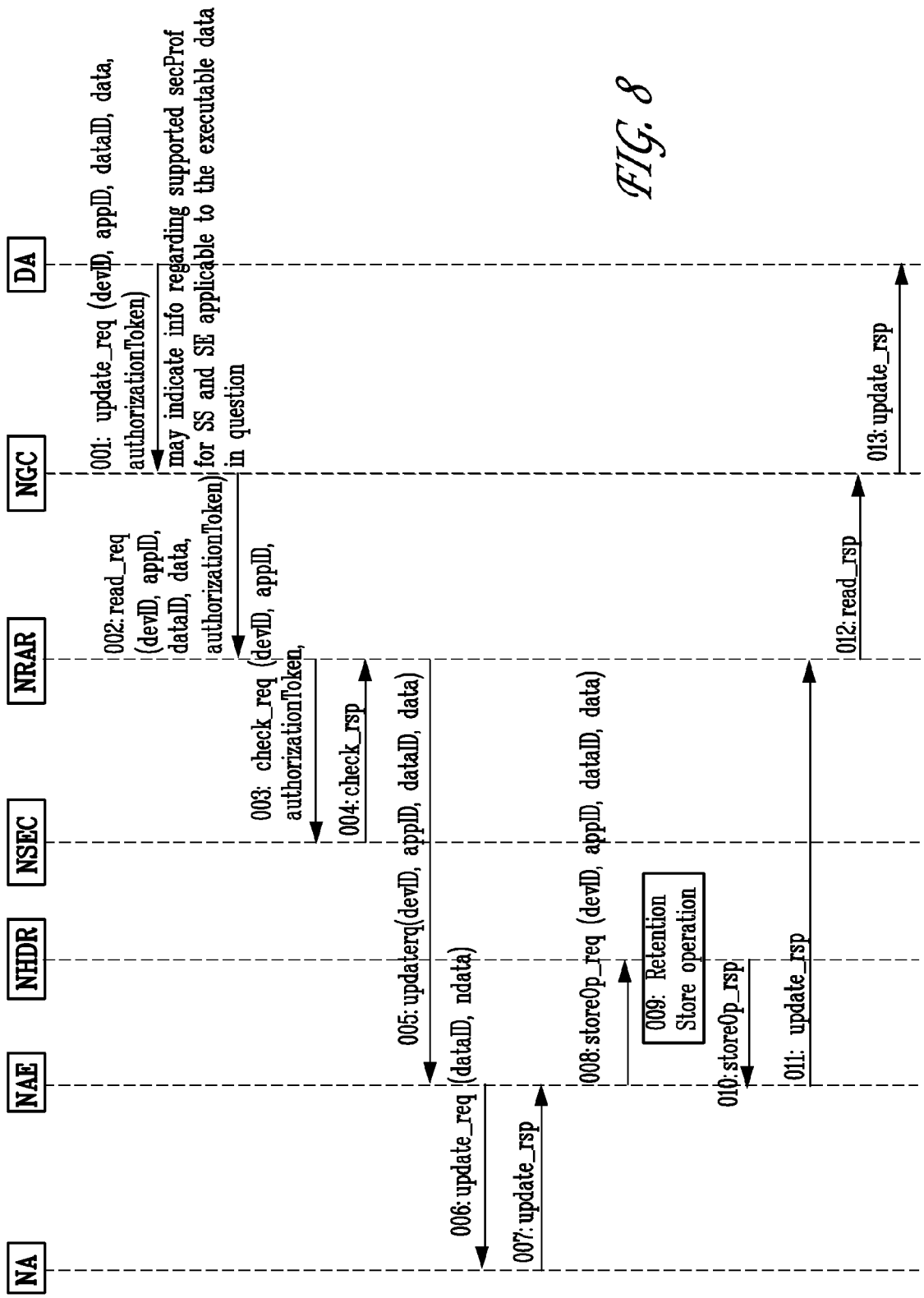
FIG. 8 illustrates an exemplary M2M device application to M2M network application write/execute call flow.

FIG. 8 illustrates an exemplary M2M device application to M2M network application write/execute call flow. When an M2M Device requires an action execution in an NA, it may conform to call flow in FIG. 8.

At 001 and 002, the DA may issue an update request to a NA by contacting NRAR through NGC. At 001, the DA may include, in the update_req message, information regarding a supported secProf for SS and SE that may be applicable to the executable data. At 003 and 004, NRAR may contact NSEC to authenticate the DA and check if it is authorized to execute actions on that particular NA. At 005, NRAR may forward the request to NAE. At 006 and 007, NAE may send the update request to the NA and gets the result of the action execution. At 008 through 010, NAE may instruct NHDR to store the exchange. At 011 through 013, the update operation result may be returned to the DA through NRAR and NGC.

One or more of the following exceptions may be provided. An update request may timeout or be rejected by NGC. There may be no response for timeout or update response with reject cause. An update request may timeout or be rejected by NRAR. There may be no response for timeout or update response with reject cause. A check request may timeout or be rejected by NSEC. There may be no response for timeout or check response with reject cause. An update request may timeout or be rejected by NAE. There may be no response for timeout or update response with reject cause. An update request may timeout or be rejected by network application. There may be no response for timeout or update response with reject cause. A store request timeout or rejected by NHDR. No response for timeout or store response with reject cause.

Call flows for a Network Application Notification of Event from M2M Device Application may be similar to call flow of FIG. 7.

Call flows for an M2M Device Application Subscription to event from M2M Network Application may be similar to the call flows of FIG. 7. As in the case of FIG. 7, an additional step for per-message (or per-notification) device or DA authentication, or, a status check of authentication (e.g., may be provided by the NSEC to an inquiring NSC or an NA) may be inserted. Secure storage may be required for keys. Secure storage may also be required for messages, if they were transmitted in encrypted form, but are to be stored in in decrypted form. Secure storage for responses sent in steps may be required. Secure execution may be provided as per FIG. 7, and in addition for decryption of encrypted messages.

Call flows for an M2M Network Application Notification of Event from M2M Device Application (Connected Device use case) may be similar to the call flows of FIG. 7. Authentication and secure communications may be similar to what is disclosed above, e.g., there may be a missing authentication required between NGC and D, and secure storage, as in FIG. 7.

Figure 9:
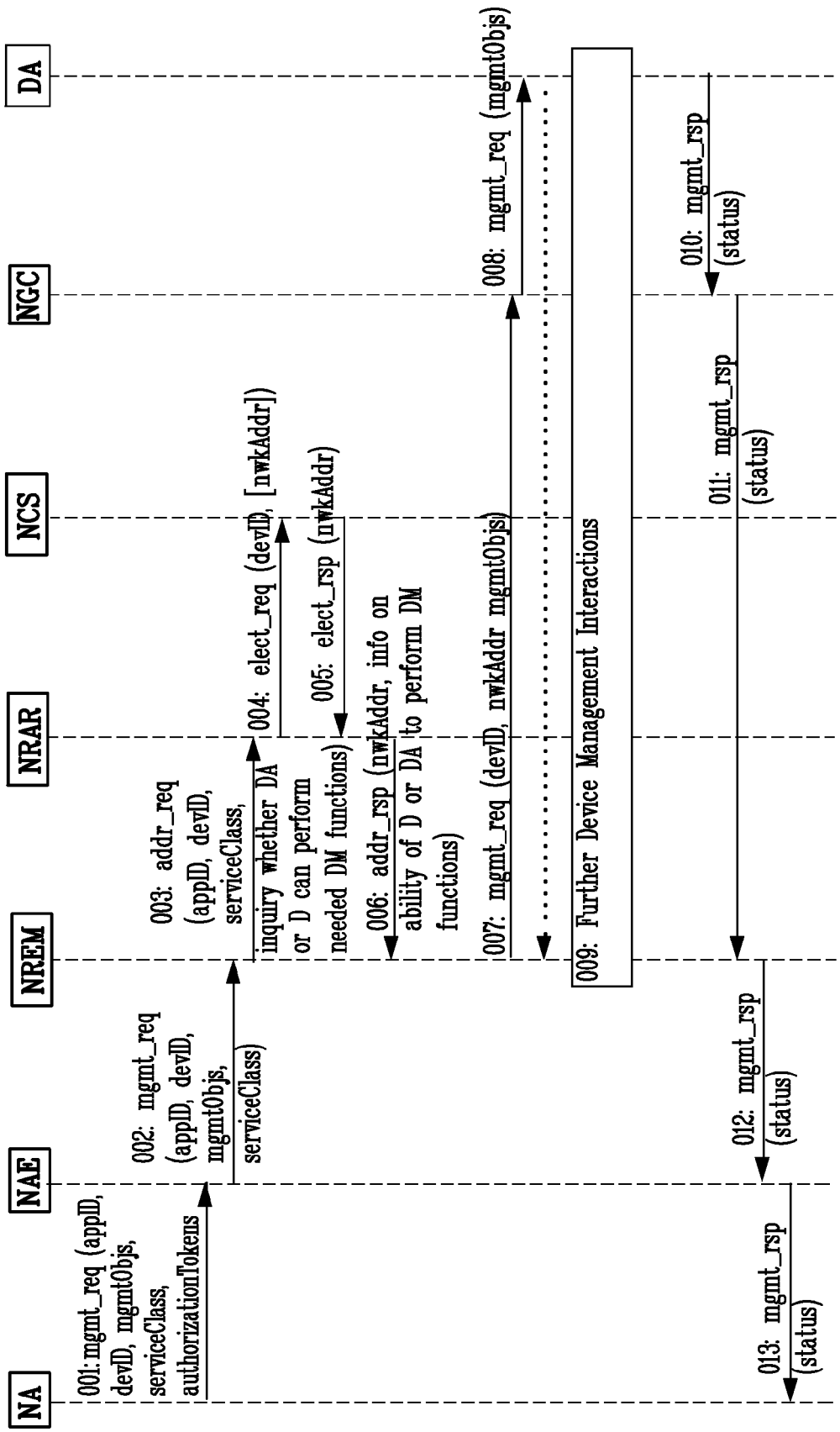
FIG. 9 illustrates an exemplary network-initiated M2M device management call flow.

FIG. 9 illustrates an exemplary network-initiated M2M device management (direct connectivity) call flow. When an NA issues device management requests to a M2M Device, it may conform to the call flow in FIG. 9. The following two cases may be distinguished: 1) if the device is online (connected) and an immediate interaction is needed; and 2) if the device is offline or if an immediate interaction with the device is not absolutely required.

In the following cases, device management requests may be initiated from an NA as a typical example. Device management request initiation may be broadened so that such requests may be initiated from trusted entities that reside in the M2M Network and Application Domain, e.g., as long as they are authenticated and authorized by NAE. NREM itself may initiate management requests for the purpose of operator administration. In such a case, the call flows of FIG. 9 may be applicable, except that the first and last two messages may not be needed any more.

In the following cases, the intended receivers of the management requests are DAs. Some management requests (e.g., firmware update, reboot, connectivity configuration, etc.) may be targeted to the whole M2M Device rather than one of its hosted DAs. In such a case, a dedicated DA may be assumed to exist in the intended M2M Device to respond to such management requests.

The management of an M2M Gateway (e.g., the M2M Gateway acts as a management client performing CM, PM, FM and software and firmware upgrade functions of itself) may follow the same procedure as in following cases, except that the target may be an M2M Gateway instead of an M2M Device.

The call flows of FIG. 9 may include one or more of the following. Assurances of the integrity status of the M2M Device management (DM) capability (e.g., information stating that a dedicated DA is operational) may be available as the network initiates a management procedure. The ability of the Device or a dedicated DA to perform such DM functions may be determined by a status update from the device. Previously obtained information about the ability of the Device or a dedicated DA to perform the DM functions may be stored in NRAR, and may be retrieved at the time that a NA needs to know if the device or a DA may be capable of performing the required DA functions.

FIG. 10 illustrates an exemplary network-initiated M2M device management call flow with gateway as a proxy connectivity. When a NA issues device management requests to one or more M2M Devices via a M2M Gateway, it may conform to the call flow in FIG. 9. The following two cases may be distinguished: 1) if the device is online (connected) and an immediate interaction is needed; and 2) if the device is offline or if an immediate interaction with the device is not absolutely required.

In the following cases, device management requests may be initiated from an NA. Such requests may be initiated from a trusted entity that resides in the M2M Network and Application Domain, e.g., as long as they are authenticated and authorized by NAE. The NREM in the M2M Network and Application Domain may initiate management requests for the purpose of operator administration. In that case, the following call flows may still be applicable except that the first and last two messages may not be needed any more.

In the following cases, the intended receivers of the management requests are DAs. Some management requests (e.g., firmware update, reboot, connectivity configuration) may be targeted to the whole M2M Device rather than one of its hosted DAs. In this case, a dedicated DA may be assumed to exist in the intended M2M Device to respond to such management requests.

The call flows of FIG. 10 may include one or more of the following. Assurances of the integrity status of the M2M Device and M2M Gateway management capability (e.g. dedicated DA is operational) may be available as the network initiates a management procedure. The gateway's ability as a proxy to perform the management functions may need to be determined prior to the management campaign to the devices. The device management update information served by the gateway to the device(s) may need to be verified upon reception and securely stored within the gateway to maintain security properties, such as the integrity and source authenticity. The Gateway's authenticity (and/or integrity) may be verifiable during the update procedure and in the status report. The ability of the dedicated DA to perform such functions may be determined by a status update from the device.

FIG. 10 illustrates an exemplary network initiated device management call flow—gateway as a proxy connectivity—online device use case. When an NA requires initiating a device management procedure with one or more online M2M Devices via a M2M Gateway, one or more of the following may apply.

At 001, the NA may contact NAE to issue a management request to one or more M2M Devices connecting to the network via the same M2M Gateway. The mgmtObjs parameter may be used to encapsulate the detailed management commands, parameters and data objects for the purpose of device management. The devID_list parameter may include a list of identifiers referring to the intended DAs located on one or more M2M Devices managed by the same M2M Gateway.

At 002, after having authenticated and ensured that the NA is authorized to issue this request, NAE may contact NREM to execute the management request. At 003, according to the detailed information provided in mgmtObjs, NREM may decide to contact NRAR to query the network addresses of the intended DAs. The NREM may inquire about the ability of the D or DA to perform data management functions. The NREM may inquire about the ability of the G or GA to perform data management proxy functions. The NREM may determine integrity status at that step due to information acquired about the G at registration. The information obtained about the integrity of G may come from a previous registration procedure (e.g., as described herein).

At 004 through 006, NRAR may contact NCS to determine which interface it may use to access the device. NCS may determine the interface based on, for example but not limited to, device reachability information and/or some policy management, and return the device network address corresponding to this interface for each intended DA to NRAR, then to NREM.

At 007 and 008, NREM may send the management request to NGC capability, which may deliver it to the M2M Gateway that manages the intended M2M Devices, choosing the network based on the determined device network address. The management request may be sent as several messages, each targeting to an intended DA or as an aggregated message for the intended DAs. The content of mgmtObjs delivered to the DAs may be modified from the original mgmtObjs received from the NA at the discretion of NREM.

At 009, According to the received management request, GREM in the M2M Gateway may need to contact NREM in the M2M Network and Application Domain for further management operations (e.g., downloading software/firmware packages, configuring parameters, or reporting statistic data). If the management operations for different DAs are the same, such operations may be optimized by aggregating (e.g., downloading/uploading the same data only once for different DAs) to reduce the communication overhead between the M2M Gateway and the M2M Network and Application Domain. The detailed interaction between the M2M Gateway and the NREM may follow the existing device management mechanism (e.g., OMA-DM, BBF-TR069). The network and gateway may bind the management procedures and status to integrity verification of the gateway to perform those tasks.

At 010, GREM in the M2M Gateway may store the management request and any management objects received from the NREM in the M2M Network and Application Domain. At 011, GREM in the M2M Gateway may initiate a new management request to each intended DA according to the original request from the NA. The new management request may conform to the original one in the sense of the management operation result, which may be different in terms of the request initiator or the management data source for the sake of optimization.

At 012, according to the received management request, each DA may need to contact GREM in the M2M Gateway for further management operations (e.g., downloading software/firmware packages, configuring parameters, or reporting statistic data). The detailed interaction between the M2M Gateway and the NREM shall follow the existing device management mechanism (e.g. OMA-DM, BBF-TR069). At 013, each DA may return the status of the management operation to GREM in the M2M Gateway.

At 14 and 015, GREM in the M2M Gateway may return the status of the management operation to NGC, which may pass it back to NREM in the M2M Network and Application Domain. For managing more than one DAs, MDGM in the M2M Gateway may aggregate the status (e.g., a successful code or a list of unsuccessful updates) in a limited time span before returning to NGC to optimize the communication overhead. The status report may be of a type whose authenticity may be made verifiable (e.g., GREM executes security procedures to sign device status information). At 015B, NREM itself, or, NSEC on behalf of NREM, may verify the authenticity of the GREM status report.

At 016 and 017, NREM in the M2M Network and Application Domain may forward the status to the NA through NAE. Depending on implementation, the NA may receive a provisional response from an entity in the M2M Core (e.g., NAE, NREM, NGC) or in the M2M Gateway (e.g., GREM), indicating the management request has been handled but not fully executed, before the final status is returned from the intended DAs. Similar modifications may be made for the device offline case.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method to provide secure operations in an M2M device, the method comprising:
   sending a security profile of the M2M device to a core network, the security profile indicating to the core network a security capability supported by the M2M device;
   receiving a security requirement from the core network for the M2M device to satisfy relating to a security of a communication session or operation of the M2M device, the security requirement comprising a security profile setting specified for at least one application, operation, or service performed on the M2M device;
   performing the communication session or operation associated with the at least one application, operation or service in a secure environment on the M2M device based on the security requirement and security profile setting; and
   storing a result relating to the communication session or operation in the secure environment.

2. The method of claim 1, further comprising determining that the communication session or operation is to be performed in the secure environment in accordance with the security requirement.

3. The method of claim 1, wherein the security requirement is received in a response from the core network relating to the security profile sent thereto.

4. The method of claim 1, wherein the security requirement includes a security profile setting for one or more of the following: secure storage, secure execution, or integrity validation.

5. The method of claim 1, wherein the operation comprises generating a key for use in the communication session or for storage of information on the M2M device.

6. The method of claim 1, wherein the secure environment is a logically distinct portion of the M2M device.

7. The method of claim 1, further comprising:
   adjusting a setting of the security profile to reflect one or more received values of the security profile setting; and
   producing a final security profile with the adjusted setting.

8. The method of claim 7, further comprising sending the final security profile to the core network to be used by the M2M device in the communication session or operation of the M2M device.

9. An M2M device configured, at least in part, to:
   send a security profile of the M2M device to a core network, the security profile indicating to the core network a security capability supported by the M2M device;
   receive a security requirement from the core network for the M2M device to satisfy relating to a security of a communication session or operation of the M2M device, the security requirement comprising a security profile setting specified for at least one application, operation, or service performed on the M2M device;
   perform the communication session or operation associated with the at least one application, operation or service in a secure environment on the M2M device based on the security requirement and security profile setting; and
   store a result relating to the communication session or operation in the secure environment.

10. The M2M device of claim 9, further configured to determine that the communication session operation is to be performed in the secure environment in accordance with the security requirement.

11. The M2M device of claim 9, wherein the security requirement is received in a response from the core network relating to the security profile sent thereto.

12. The M2M device of claim 9, wherein the security requirement includes a security profile setting for one or more of the following: secure storage, secure execution, or integrity validation.

13. The M2M device of claim 9, wherein the operation comprises generating a key for use in the communication session or for storage of information on the M2M device.

14. The M2M device of claim 9, wherein the secure environment is a logically distinct part of the M2M device.

15. The M2M device of claim 9, further configured to:
   adjust a setting of the security profile to reflect one or more received values of the security profile setting; and
   produce a final security profile with the adjusted setting.

16. The M2M device of claim 15, further configured to send an indicator to the core network indicating the final security profile to be used by the M2M device in the communication session or operation of the M2M device.

* * * * *